2,485,059

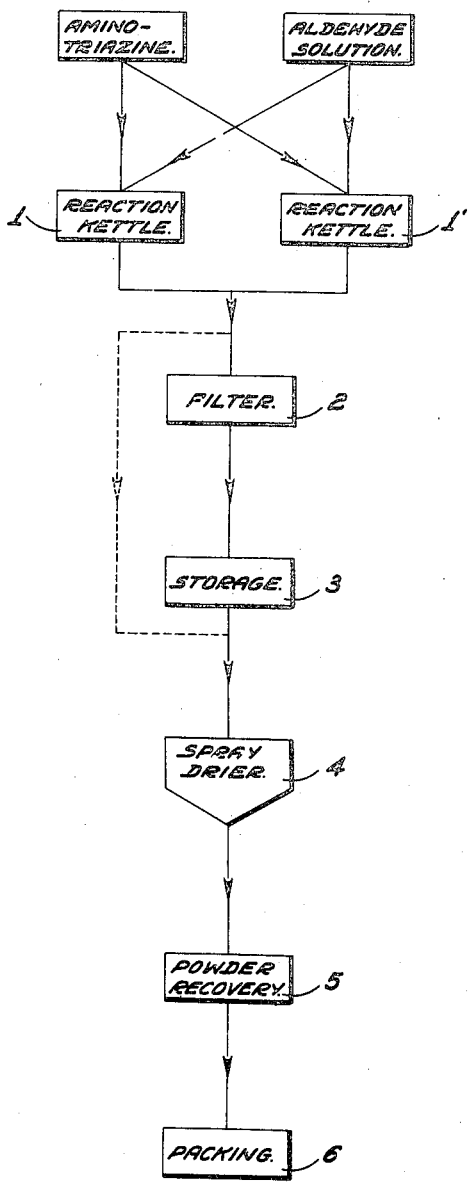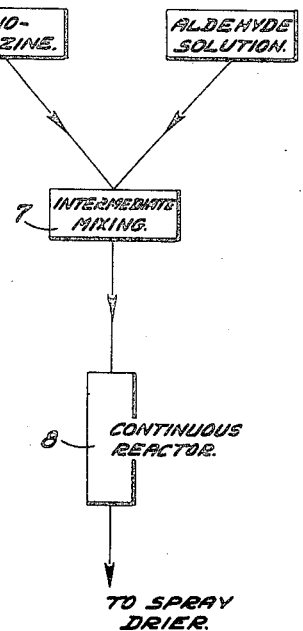
INVENTORS
HAROLD W. MOHRMAN.
FRANCIS E. REESE.
BY
THEIR ATTORNEY Patented Oct. 18, 1949

UNITED STATES PATENT OFFICE 2,485,059

MELAMINE CONDENSATION PRODUCT

Harold W. Mohrman and Francis E. Reese, Springfield, Mass., assignors to Monsanto Chemical Company, St. Louis, Mo., a corporation of Delaware Application May 6, 1944, Serial No. 534,422

1 Claim. (Cl. 260—249.5)

This invention relates to new aminotriazine-aldehyde products.

It is known to prepare melamine-formaldehyde products by heating a mixture of melamine with aqueous solutions of formaldehyde. However, the solid products that have been recovered from such prior aqueous reaction products have been lacking in water solubility and consequently, their use has been restricted.

It is an object of this invention to provide solid aminotriazine-aldehyde reaction products soluble in all proportions in water at ordinary temperatures. A particular object is to provide solid melamine-formaldehyde reaction products which may be dissolved in all proportions in water at ordinary temperatures.

These and other objects are attained by preparing clear aqueous solutions of aminotriazine-aldehyde reaction products having unlimited solubility in water and recovering the solid reaction product while maintaining said unlimited solubility. According to a particular embodiment of this invention, a mixture of melamine and an aqueous formaldehyde solution is heated under alkaline conditions until a clear solution is formed and then the condensation product is recovered in the solid state by substantially instantaneous dehydration of the clear solution.

The following examples are illustrative of the present invention. Parts are parts by weight.

Example I 126 parts of melamine (1 molecular proportion) and 325 parts (4 molecular proportions) of a 37% aqueous formaldehyde solution are charged to a reaction kettle equipped with a stirrer. Thereafter, while stirring, sufficient sodium hydroxide in the form of a 20% aqueous solution is added to produce a pH of 9.0–9.5 and while continuing the stirring the mixture is heated to about 80° C. This requires about 15–30 minutes and by the time the temperature reaches 80° C. a clear syrup is obtained. The hot syrup is filtered, while maintaining its temperature at 80–85° C., into a vessel equipped with a stirrer and heated to maintain the filtered syrup at 80–85° C. Thereafter the syrup is fed to a spray drier at a rate sufficient to produce about 225 parts of solid product per hour. The spray drying of the hot aqueous syrup is accomplished by spraying the material into a heated stream of gas which initially has a temperature of about 190–210° C., but immediately after the water is removed from the spray, is cooled so that the outlet gas temperature is below the fusion temperature of the dehydrated product, i. e. below about 65–70° C. but above the dew point of the gas. The cooling of the gas stream may be effected by bleeding cooled air into the lower portion of the drier. The mixture of powdery product and the outflowing gas is then passed through a dust collector, such as a cyclone collector, to separate out the powdery product.

During the operations prior to spray drying, the aqueous syrup is maintained at a pH of 9.0–9.5 by adding additional sodium hydroxide solution when necessary.

The powdered product obtained in the manner described above possesses solubility in water in all proportions at ordinary temperatures, i. e. 20–30° C., and exhibits an amorphous structure when subjected to X-ray examination. The product is believed to comprise essentially monomeric methylol melamines, particularly tetramethylol melamine, but may contain a small proportion of low polymers thereof, for example, dimers.

The characteristics of the product in this example are to be contrasted with the melamine-formaldehyde products that separate on cooling the initial clear aqueous reaction mixture, for example, to a temperature below 70° C. Such products possess a crystalline structure when subjected to X-ray examination, and have only a limited solubility in water.

The product obtained according to the above example is to be further contrasted with the resinous products resulting from extended heating of the initial clear reaction mixture especially at temperatures above those used herein. Such products precipitate out on dilution of the aqueous solutions thereof, the precipitate comprising a resinous material of limited solubility in water.

Example II

Example I is repeated except that a mixture of 126 parts of melamine (1 molecular proportion) and 162 parts (2 molecular proportions) of 37% aqueous formaldehyde solution is reacted in the presence of 177 parts of added water. Due to the lower proportion of formaldehyde as compared with Example I, the outlet gas temperature in the spray drier may be higher than that employed in Example I, for example, 80° C. without causing melting of the powdered product. The product has an amorphous structure and possesses unlimited solubility in water at ordinary temperatures.

Example III

Example I is repeated except that a mixture of 126 parts (1 molecular proportion) of melamine, 405 parts (5 molecular proportions) of 37% aqueous solution of formaldehyde is reacted in the presence of 159 parts of added water. In this case it is desirable that the outlet gas temperature in the spray drier be below about 60° C. in making a powdered product. The product has the characteristic properties of the products of this invention.

*Example IV*

Example I is repeated except that a mixture of 126 parts (1 molecular proportion) of melamine, 486 parts (6 molecular proportions) of 37% aqueous solution of formaldehyde is reacted in the presence of 153 pounds of added water. In this case it is desirable that the outlet gas temperature in the spray drier be below 55° C. in making a powdered product. The product has the characteristic properties of the products of this invention.

*Example V*

A mixture of 127 parts of ammeline (1 molecular proportion) and 162 parts (2 molecular proportions) of a 37% aqueous solution of formaldehyde and sufficient sodium hydroxide in the form of a 20% aqueous solution to produce a pH of 9.0–9.5, is heated to about 80° C. with stirring. This requires about 15–30 minutes and by the time the temperature reaches 80° C., a clear syrup is obtained. The ammeline-formaldehyde condensation product is recovered by spray drying as in the previous examples. The powdery product has unlimited solubility in water at ordinary temperatures.

The length of time during which the aqueous reaction mixtures of this invention possess unlimited dilutability varies to some extent with the conditions obtaining in the reaction mixture, as for example, temperature, ratio of formaldehyde to melamine, pH, degree of dilution. Generally, reaction conditions are such that it is desirable to spray dry the aqueous reaction mixture within a short time from its formation in order to avoid converting a portion of the product to material having only a limited solubility in water at ordinary temperatures. This is particularly the case when the batch size is such as to require a substantial period of time for the spray drying step. Of course, the use of a spray drier of increased capacity tends to reduce this hazard in that the time required to spray dry a batch of given size is reduced.

As pointed out hereinbefore, the clear initial reaction product of melamine and aqueous solutions of formaldehyde possesses the characteristic of crystallizing from the aqueous medium on cooling. The crystallization product possesses only a limited solubility in water at ordinary temperatures and to avoid the separation of crystalline product, the clear aqueous reaction mixture is initially heated and thereafter maintained above its crystallization temperature.

The crystallizing effect referred to above may be inhibited by dilution of the reaction mixture. This is exemplified in Example II where the proportion of formaldehyde to melamine is such that if it were not for the added water the mixture would pass directly from a slurry of melamine to a slurry of crystalline reaction product and in Examples III and IV where the added water tends to prevent crystallization of the added water of the initial clear aqueous product before completion of the spray drying. Greater dilutions of the reaction mixtures than those given in the examples may be employed when advantageous.

The minimum reaction temperature employed varies with other reaction conditions, as for example, degree of dilution, ratio of aldehyde to aminotriazine and generally it is desirable that the reaction temperature be somewhat above the critical temperature, i. e. 5–10° C. above the crystallizing temperature. In a preferred embodiment of this invention a degree of dilution is selected such that for the particular ratio of aldehyde to aminotriazine employed, a reaction temperature of about 70–90° C. may be used. Such a temperature range makes possible a rate of reaction that may be advantageously correlated with other reaction conditions to produce the characteristic products of this invention.

It is to be understood that this invention is not limited to the particular conditions of spray drying given in the examples. For example, the temperatures required may vary to some extent with the construction of the drier. Thus, the temperature of the heated gas stream may vary to some extent although generally temperatures in the range 175° C.–235° C. are most suitable. Also, the temperature of the cooling gas may be varied. Generally, it is preferred to cool the dehydrated product below its fusion temperature, although under some circumstances this may not be necessary. However, to avoid undue polymerization, temperatures below 80–100° C. are usually employed.

Furthermore, other methods of recovering the solid reaction product may be used, provided the drying is substantially instantaneous, as for example, drum drying, whereby a thin film is subjected to a sufficiently raised temperature, e. g. 175° C.–235° C., for a short period of time to volatilize the aqueous medium. A particularly advantageous process for drum drying comprises the use of vacuum whereby lower temperatures may be employed. In any event, the dry solid should be removed from the zone of high temperature as soon as possible to prevent undue polymerization and lessening of degree of water-solubility. Thus, when using the temperature conditions given in the examples, exposure to these high temperatures is generally less than about one minute.

In carrying out the process of this invention the pH of the reaction mixture may be substantially varied. However it is preferable that the reaction mixture be maintained in an alkaline condition, for example, at a pH of 7.5–10 and according to a preferred embodiment of this invention the aminotriazine and aldehyde are reacted at a pH of 8.8–9.5. Various alkaline materials may be used in adjusting the pH to the preferred range, including, for example, inorganic materials such as sodium hydroxide, potassium hydroxide or sodium or potassium carbonate; organic materials such as quaternary ammonium bases, e. g. dimethyl dibenzyl ammonium hydroxide, trimethyl benzyl ammonium hydroxide, tetraethyl ammonium hydroxide, tetraethanol ammonium hydroxide, amines such as ethylene diamine or such alkylol amines as triethanol amine, ammonia, or basic salts such as trisodium phosphate. When desired, mixtures of two or more alkaline materials may be used.

In place of melamine, other aminotriazines may be used, including substituted melamines, e. g., chlorinated, alkylated or phenylated melamines, and deaminated melamines such as ammeline, ammelide and the like. Other examples of suitable aminotriazines are 2,4,6-triethyl and triphenyl-triamino-1,3,5-triazines, 2,4,6 - trihydrazino-1,3,5-triazine and the corresponding condensed triazines such as melam and melem, 2-amino-1,3,5, triazine, 2-chloro-4,6-diamino-1,3,5, triazine, 2-phenyl-4-amino-6-hydroxyl-1,3,5 triazine and 6-methyl-2,4-diamino-1,3,5-triazine. Mixtures of aminotriazines are also included within the scope of this invention.

The preferred reaction products of this invention are of the thermosetting type so that generally the aminotriazine employed is one having at least three aldehyde-reactable positions.

In place of formaldehyde, other water-soluble aldehydes may be used, as for example, acetaldehyde and propionaldehyde; water-soluble hydroxy aldehydes such as glycollic aldehyde, glyoxylic aldehyde; water-soluble unsaturated aldehydes such as crotonaldehyde, acrolein and tiglaldehyde; halogen-substituted water-soluble aldehydes such as chloral; dialdehydes such as glyoxal, and the like.

The proportion of aldehyde to aminotriazine employed in the reaction mixture may be widely varied, for example, in the case of formaldehyde and melamine from 1-6 mols of formaldehyde may be reacted with one mol of melamine. Generally, however, it is desirable to react at least 2 mols of formaldehyde per mol of melamine and a formaldehyde-melamine molar ratio of 2.0-5:1 is particularly preferred.

In the case of aminotriazines having a reduced number of aldehyde-reactable positions as compared with melamine, i. e., ammeline, the upper limits of the proportion of aldehyde given above may be reduced according to the reduction in reactable positions. In the case of dialdehydes, such as glyoxal, the upper limits of the proportion of aldehyde may be reduced from those given above.

The following illustrates a particular embodiment of this invention wherein the aminotriazine-aldehyde addition product is continuously recovered in spray dried form. This procedure obviates difficulties encountered in spray drying large batches of material wherein the last of the batch is liable to be reacted to such a stage that the spray dried product does not possess the characteristic solubility of this invention. This phase of the invention is illustrated in greater detail with reference to the accompanying drawing in which Fig. 1 is a flow sheet showing diagrammatically one method of carrying out the invention; and Fig. 2 is a flow sheet showing diagrammatically a modified procedure.

Referring to Fig. 1 of the drawing predetermined amounts of aminotriazine and aldehyde are supplied to reaction kettle 1 or 1' as indicated by the flow chart. The pH of the mixture is adjusted when necessary to the desired value by suitable additions as indicated hereinbefore. The desired degree of reaction is effected as described in the examples and the clear aqueous reaction mixture is then passed through filter 2 which is maintained in a heated condition to avoid crystal separation, and thence into storage vessel 3 which is also maintained in a suitable heated condition. Thereafter, the aqueous reaction product is continuously supplied to spray drier 4 where the condensation or addition product is separated from the aqueous medium by spraying into a heated gas stream and then the dehydrated product immediately cooled and passed into powder recoverer 5 where the solid product is separated from the carrying gas stream and cooled to a temperature for packing. The powder that is collected is continuously removed and packaged at 6.

In operating the system shown in Fig. 1 continuously, at the proper point in the processing of a batch prepared in reaction kettle 1 or 1', a second batch is started in the second kettle so that at the time the first kettle is drained, material may be supplied from the second. The preparation of reaction product alternately in the reaction kettles is continued as long as it is desired to operate the remainder of the system.

In some cases it may not be necessary to filter the aqueous reaction mixture. In such cases the reaction mixture may be passed directly to spray drier 4 as indicated by dotted lines in Fig. 1.

The size of the batches of reaction product produced in the reaction kettle is correlated with the rate of spray drying and duration of unlimited dilutability of the aqueous reaction product so that the product coming from the spray drier possesses solubility in all proportions in water at room temperature. If necessary, additional reaction kettles may be provided, for example, when the spray drier has a capacity in excess of that provided by reaction kettles 1 and 1'.

According to another embodiment of this invention the melamine and formaldehyde are continuously reacted as well as continuously spray dried. Thus, referring to Fig. 2 of the drawing, predetermined amounts of aminotriazine, aldehyde and, when necessary, material for adjusting the pH of the mixture are continuously fed into mixer 7 equipped with a stirrer and the mixture thoroughly stirred to form a uniform slurry. This slurry is then passed through a heated reactor 8 so designed as to maintain a slurry in a uniform condition. During passage through reactor 8 the slurry is heated to the desired temperature for producing a clear syrup. The rate of passage of the slurry and the temperature and length of the reactor are so correlated that the mixture is obtained in a clear condition prior to reaching the outlet end of the reactor. After leaving the reactor, the clear syrup is continuously fed into a spray drier after passing through a filter, if necessary, and further processed as described in connection with the flow chart in Fig. 1.

Aqueous solutions of the products of this invention may be easily prepared in water at room temperature, thus obviating expensive equipment required for prior aminotriazine-aldehyde reaction products which can be dissolved only in heated water. A further advantage of the products of this invention resides in the fact that aqueous solutions of all concentrations may be employed at ordinary temperatures, thus making it possible, for example, not only to prepare such solutions at room temperature, but to apply them in the desired manner without causing substantial polymerization of the aminotriazine aldehyde product.

The products of this invention, as illustrated by the foregoing examples, are found to be extremely stable when maintained at room temperature over long periods of time. On heating they may be converted into the infusible, insoluble state. Aqueous solutions of these products are particularly valuable as coating and/or impregnating materials for cloth, paper, metal, wood and the like, as intermediates in preparing etherified resins, e. g. alkylated resins, as adhesives, e. g. for plywood, in preparing molding compositions, etc.

In preparing insoluble, infusible products, hardening agents may be advantageously employed, particularly, acidic hardening agents or neutral materials which develop acidic properties on heating. Examples of such materials are phthalic acid, phthalic anhydride, tartaric acid, phosphoric acid, benzoyl phthalimide, reaction products of a tertiary amine such as triethanol amine with an acid such as those given above. Examples of basic catalysts are calcium oxide, sodium carbonate, sodium bicarbonate, etc.

Mixtures of the products of this invention with plasticizers, modifiers, resins, coloring matter and the like, may be prepared. Examples of resins are urea-aldehyde, phenol-aldehyde, vinyl and alkyd resins and in particular, aqueous solutions or dispersions of the foregoing. Particularly valuable are mixtures of the products of this invention and hydroxylated vinyl resins containing sufficient hydroxyl groups to be self-dispersible in water such as water-soluble polyvinyl alcohols.

It is to be understood that the above description is given by way of illustration only, and not of limitation, and that deviations are possible within the spirit of the invention.

What is claimed is:

A process for preparing a powdery, water-soluble, amorphous melamine-formaldehyde reaction product, aqueous solutions thereof being capable of unlimited dilution with water without precipitation which comprises reacting 1 molecular proportion of melamine with an aqueous solution of 4 molecular proportions of formaldehyde at a pH of 8.5–9 and at a temperature of about 80–85° C., dehydrating the melamine-formaldehyde addition product by passing a spray of the reaction mixture into a heated air stream having an inlet temperature of 190–210° C. and an outlet temperature of about 65° C., immediately cooling the dehydrated product to about 65° C. and recovering the powdery, amorphous product, the duration of the reaction of the melamine and the formaldehyde prior to spray drying coupled with the duration of the spray drying step at the selected temperatures being sufficiently short so that aqueous solutions of the solid, powdery product are capable of unlimited dilution with water without precipitation.

HAROLD W. MOHRMAN.
FRANCIS E. REESE.

REFERENCES CITED

The following references are of record in the file of this patent:

UNITED STATES PATENTS

| Number | Name | Date |
|---|---|---|
| 2,191,362 | Widmer | Feb. 20, 1940 |
| 2,197,357 | Widmer | Apr. 16, 1940 |
| 2,260,239 | Talbot | Oct. 21, 1941 |
| 2,320,818 | D'Alelio | June 1, 1943 |
| 2,387,547 | Widmer | Oct. 23, 1945 |

FOREIGN PATENTS

| Number | Country | Date |
|---|---|---|
| 206,608 | Switzerland | 1939 |
| 535,408 | Great Britain | 1941 |

OTHER REFERENCES

British Plastics, pp. 508–520, Feb. 1943.